United States Patent
Champagne

(10) Patent No.: US 7,499,849 B1
(45) Date of Patent: Mar. 3, 2009

(54) GENERIC MESSAGE COMPOSING FACILITY

(75) Inventor: Steven R. Champagne, Carmel, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/164,535

(22) Filed: Jun. 30, 2008

(51) Int. Cl.
G06F 17/28 (2006.01)

(52) U.S. Cl. ......................................... 704/8
(58) Field of Classification Search ................ 704/8
See application file for complete search history.

(56) References Cited

U.S. PATENT DOCUMENTS

| | | | |
|---|---|---|---|
| 5,524,253 A | 6/1996 | Pham | |
| 5,701,423 A | 12/1997 | Crozier | |
| 6,092,037 A * | 7/2000 | Stone et al. | 704/8 |
| 6,546,365 B1 * | 4/2003 | Gajda et al. | 704/8 |
| 7,031,906 B2 * | 4/2006 | Shimohata et al. | 704/2 |
| 7,231,342 B2 * | 6/2007 | Edwards et al. | 704/3 |
| 7,272,406 B2 * | 9/2007 | Chava et al. | 455/466 |
| 2006/0095303 A1 | 5/2006 | Baldwin et al. | |
| 2007/0239880 A1 | 10/2007 | Alperin | |

FOREIGN PATENT DOCUMENTS

JP 200724982 9/2007

* cited by examiner

*Primary Examiner*—Susan McFadden
(74) *Attorney, Agent, or Firm*—McGinn IP Law Group, PLLC

(57) ABSTRACT

A method of providing a database of generic messages for diverse applications, includes examining an application for messages to be output to a user of the application, returning a found message from the examined application in a first language, determining if a generic message appropriate for the returned message is available in a generic message composing facility, appropriating an appropriate generic message from the generic message composing facility if it is determined that said generic message is available, providing an appropriate translation of the appropriated generic message in a second language if it is determined that said generic message is available, adding a translation of the returned message to the generic message composing facility if it is determined that said generic message is not available, and outputting the translated message to the application in the second language.

1 Claim, 5 Drawing Sheets

GENERIC MESSAGE COMPOSING FACILITY

BACKGROUND OF THE INVENTION

1. Field of the Invention

The present invention generally relates to a method and apparatus for providing generic messages, and more specifically for providing a database of generic messages for application developers of diverse applications.

2. Description of the Related Art

Software developers who need to create or provide feedback informative messages for a global user base must have them translated. The cost of complete translation to all languages is prohibitive. Invariably, only a small subset of languages is translated. Making application messages intelligible to a new-language user base requires additional cost and effort.

For example, a significant percentage of programming applications likely need to say something similar to "The value (VALUE) specified for 'FIELD' is incorrect."

However, each developer has to translate this message for each program.

SUMMARY OF THE INVENTION

In view of the foregoing, and other, exemplary problems, drawbacks, and disadvantages of the conventional systems, it is an exemplary feature of the present invention to provide a database of generic messages for diverse applications, the method including examining an application for messages to be output to a user of the application, returning a found message from the examined application in a first language, determining if a generic message appropriate for the returned message is available in a generic message composing facility, appropriating an appropriate generic message from the generic message composing facility if it is determined that said generic message is available, providing an appropriate translation of the appropriated generic message in a second language if it is determined that said generic message is available, adding a translation of the returned message to the generic message composing facility if it is determined that said generic message is not available, and outputting the translated message to the application in the second language.

Instead of all application developers being burdened with the cost and effort of translating unique messages as in conventional application programming, in an exemplary aspect of the present invention application developers may simply choose pre-defined message kinds and patterns of messages. The developers then need do nothing further because if a generic message composing facility (henceforth "GMCF") library and catalogs of generic messages translated to desired locales are installed on a target machine, the libraries will provide the appropriate translated messages for the application. In some exemplary embodiments, this may include choosing a "second choice" language if a catalog for a specific language is not installed, or defaulting to English.

An additional benefit of an exemplary aspect of the present invention would be an ongoing uniformity and patterning of messages, thus making disparate applications—which happen to output some common intersection of messages—more understandable from a point of view of the intended recipient of the message. The fact that different applications (using the GMCF) would all say "The value (VALUE) specified for 'FIELD' is incorrect." the same way would give users more confidence they "know what the application means", because the message recipient would likely have seen same generic message elsewhere.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF EXEMPLARY EMBODIMENTS OF THE INVENTION

Figure 1:
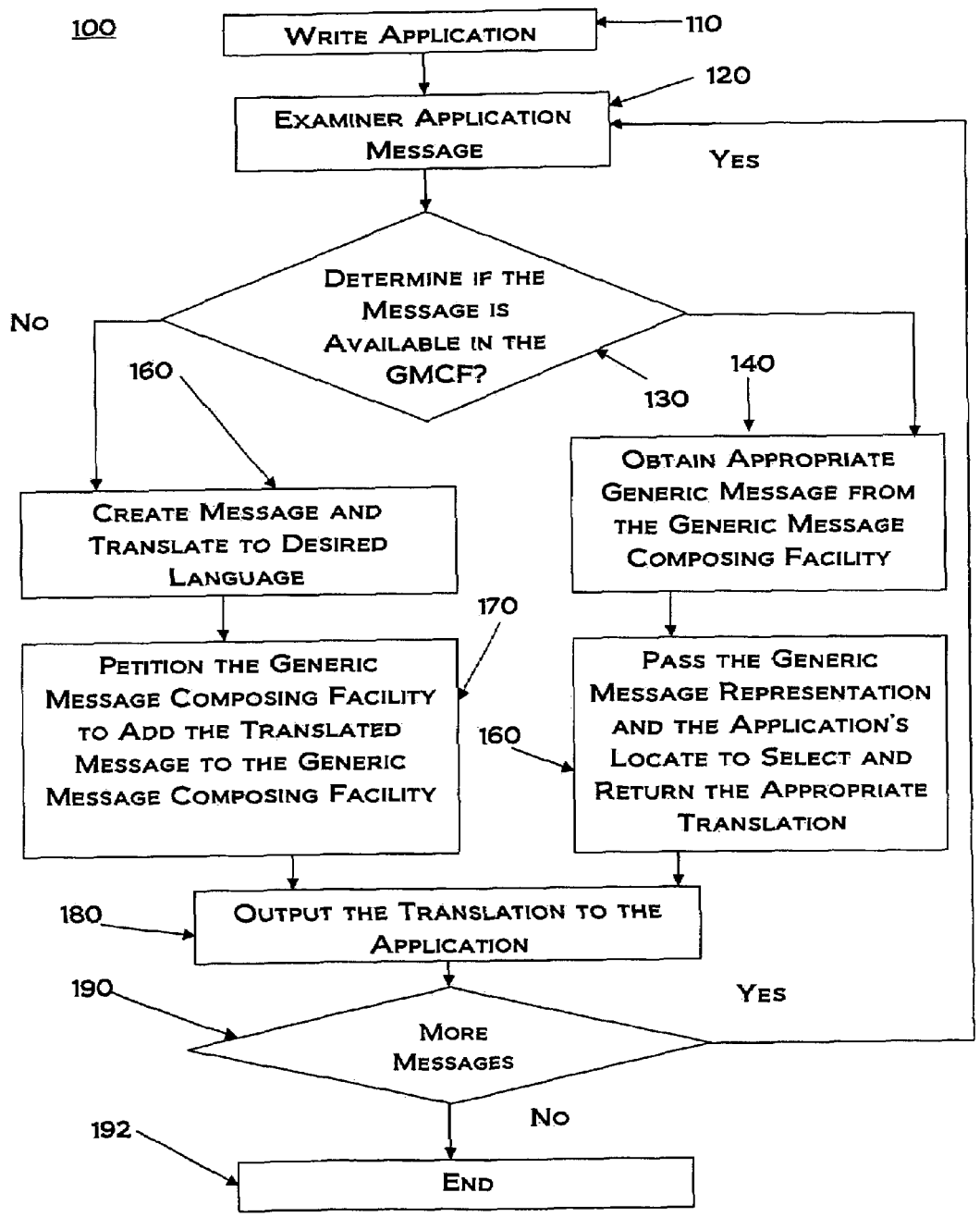
FIG. 1 illustrates an exemplary method 100 for providing generic translations, according to an exemplary aspect of the present invention.

Referring now to the drawings, and more particularly to FIGS. 1-5, there are shown exemplary embodiments of the method and structures according to the present invention.

Instead of incurring the cost of translating to specific languages each time a message is introduced, a developer may use a generic message composing facility according to exemplary embodiments of the present invention, consisting of functions (or C-language-like function-style macros) which represent a large subset of the kinds/patterns of phrases and constructs which a message would have.

In an exemplary embodiment, a generic message composing facility would provide appropriate translations of generic messages to diverse applications. Thus, a message would be provided to any application, developed by any developer or programmer.

FIG. 1 illustrates an exemplary method 100 for providing generic translations of messages for diverse applications. Referring to FIG. 1, a developer would write an application in Step 110. Exemplarily, the application would include messages for the user of the application. Typically, the developer would intend for the application to be eligible for translation into different languages.

In order to quickly and easily provide translations of these messages according to exemplary embodiments, upon completion of the application, the developer or an automated process would examine messages and other translatable text and messages for the application in Step 120. Thus, in some embodiments, a developer would identify these messages. In other exemplary embodiments, these translatable messages would be identified automatically through various known searching functions.

Upon finding a message that is to be translated, the method 100 determines whether the intended message is provided in a generic message composing facility in Step 130.

If the method 100 determines that Step 130 has found a message available in the generic message composing facility, the method 100 obtains the appropriate generic message from the generic message composing facility in Step 140. In an exemplary embodiment, generic messages may be shared across potentially diverse applications.

Once the generic message representation is obtained in Step 140, the appropriate translation is returned in Step 150.

For example, in an exemplary Step 150, a developer may determine which languages should be searched for. In another exemplary Step 150, a program can automatically detect the appropriate translation.

If the method 100 determines that Step 130 has not found a message available in the generic message composing facility, the method 100 creates the messages and translations in Step 160. In an exemplary embodiment, a developer would use either a human translator or a translating software application to translate the message to the desired language. Such translations may be costly as the designer may have little or no idea if the translation is in fact accurate.

After creating the translation in Step 160, the method 100 may petition the generic message composing facility to include the message in the generic message composing facility in Step 170. In an additional exemplary Step 170, the newly created messages of Step 160 would be automatically added to the generic message composing facility.

Referring to Step 180, the translated message is then output and at Step 190, the method 100 determines if more messages are to be translated. If there are no more messages to be translated, the method 100 would end at Step 192. Otherwise, if more translations remain, the method 100 returns to step 120 to examine the application for more messages to be translated.

Figure 2:
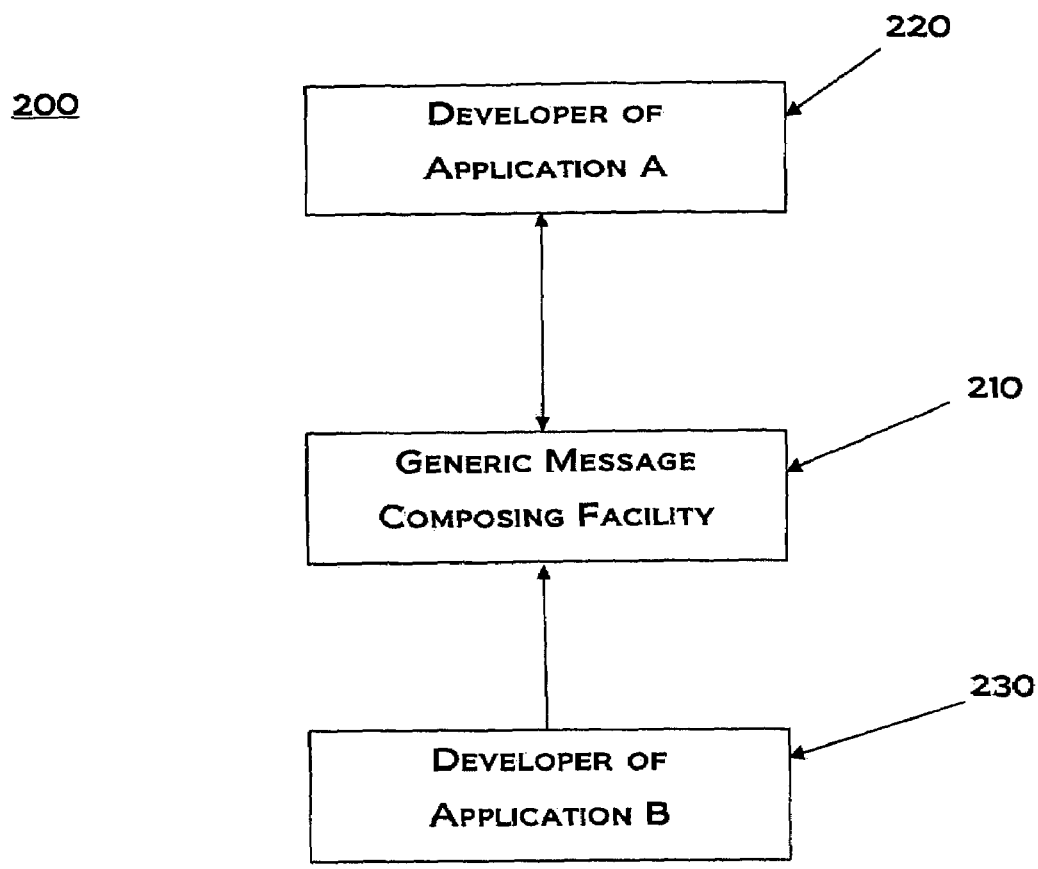
FIG. 2 illustrates an exemplary system 200 for providing generic translations, according to an exemplary aspect of the present invention.

FIG. 2 illustrates an exemplary system 200 to provide generic translations (e.g., according to method 100 as described above). Referring to FIG. 2, system 200 includes generic message composing facility 210 associated with developer A 220 and developer B 230.

Thus, when developer A 220 provides a translated generic message to generic message composing facility 210, developer B 230 may be able to search for a retrieve the translated generic message from the generic message composing facility 210.

Figure 3:
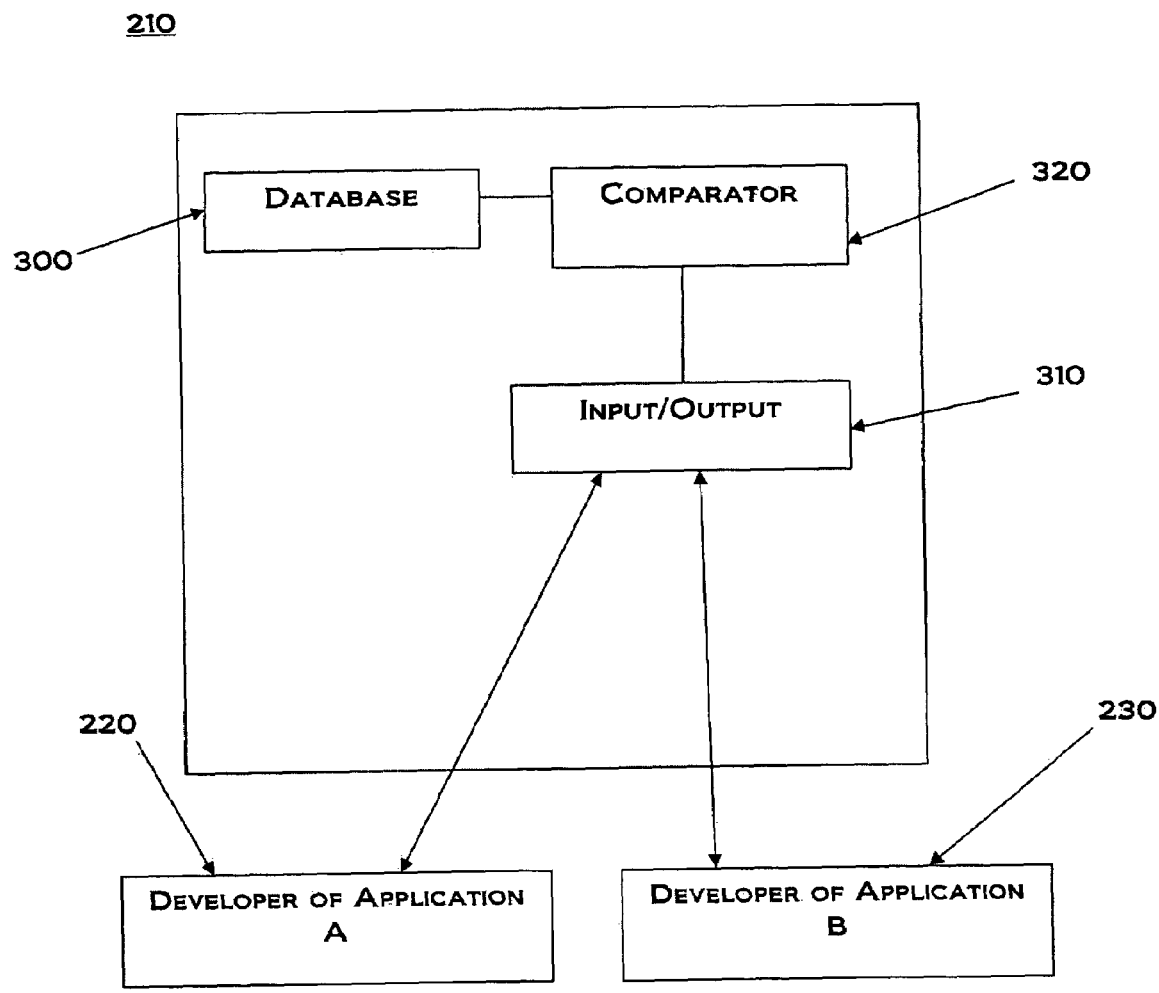
FIG. 3 illustrates an exemplary generic message composing facility 210, according to an exemplary aspect of the present invention.

FIG. 3 illustrates an exemplary generic message composing facility 210 of FIG. 2. Referring to FIG. 3, generic message composing facility 210 may include a database 300, comparator 320, and input/output unit 310.

Comparator 320 may receive a request for a translated message from any developer associated with generic message composing facility 210. For example, referring to FIGS. 2 and 3, Developer A 220 and Developer B 230 would be associated with comparator 320 through input/output unit 310.

Exemplarily, comparator 320 would identify a generic message and then identify the desired languages for this generic message. For example, if comparator 320 receives a request for generic message "insert disk A," to be translated into the Czech language, comparator 320 would determine if a Czech language version of that generic message exists.

Comparator 320 can search database 300 to determine if an appropriate generic message is available. If an appropriate generic message is available, comparator 320 can retrieve the appropriate generic message from database 300 and provide the appropriate generic message to the respective developer for the application.

Figure 4:
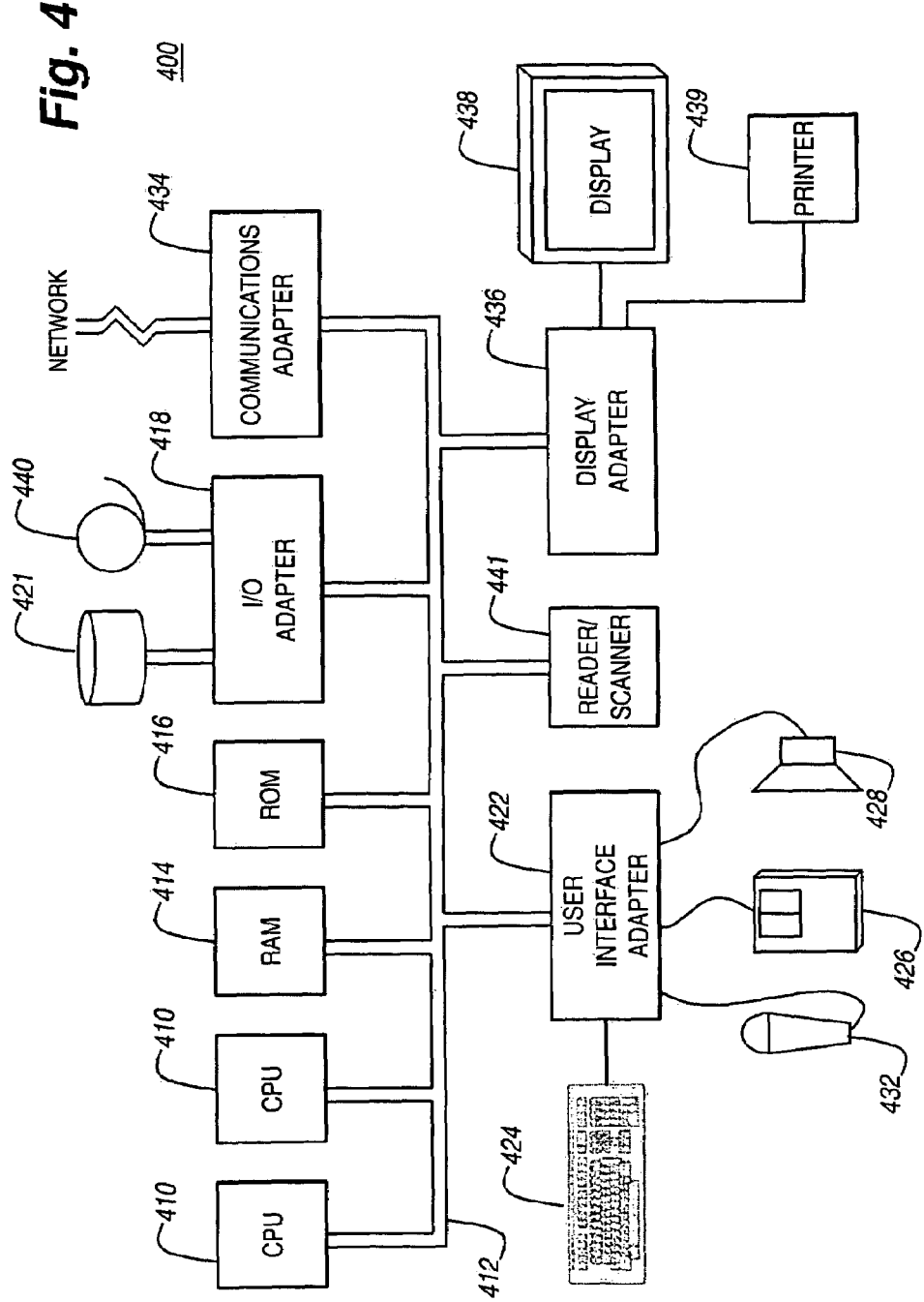
FIG. 4 illustrates a typical hardware configuration which may be used for implementing the computer system and method according to the exemplary aspects of the present invention.
Figure 5:
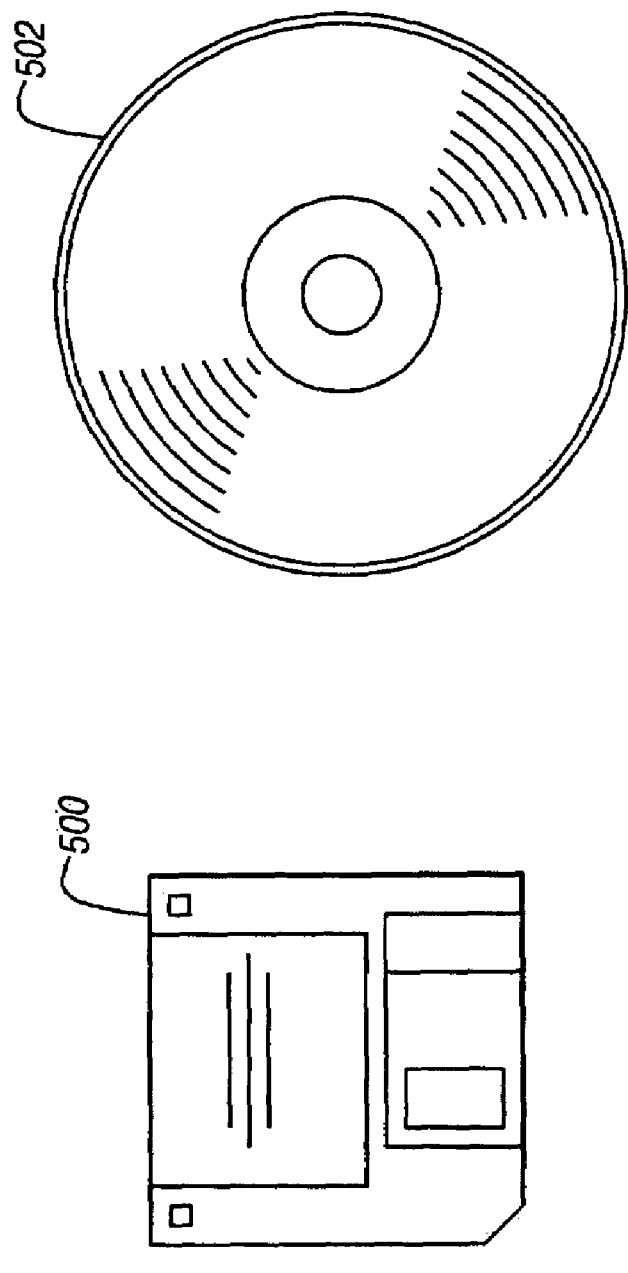
FIG. 5 illustrates a magnetic data storage diskette 500 and CD-ROM 502 to store the method 100.

Referring now to FIG. 4, system 400 illustrates a typical hardware configuration which may be used for implementing the inventive system and method for buying and selling merchandise. The configuration has preferably at least one processor or central processing unit (CPU) 410. The CPUs 402 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting an information handling system to a data processing network, the Internet, and Intranet, a personal area network (PAN), etc., and a display adapter 436 for connecting the bus 412 to a display device 438 and/or printer 439. Further, an automated reader/scanner 441 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 410 to execute a sequence of machine-readable instructions. These instructions may reside in various types of signal bearing media.

Thus, this aspect of the present invention is directed to a programmed product, comprising signal-bearing media tangibly embodying a program of machine-readable instructions executable by a digital data processor incorporating the CPU 410 and hardware above, to perform the method of the invention.

This signal-bearing media may include, for example, a RAM contained within the CPU 410, as represented by the fast-access storage for example. Alternatively, the instructions may be contained in another signal-bearing media, such as a magnetic data storage diskette 500 or CD-ROM 502, (FIG. 5), directly or indirectly accessible by the CPU 410.

Whether contained in the computer server/CPU 410, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as "C," etc.

While the invention has been described in terms of exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method of providing a database of generic messages for diverse applications, the method comprising:
   examining an application for messages to be output to a user of the application in a first language;
   returning a found message from the examined application;

determining if a generic message appropriate for the returned message is available in a generic message composing facility;

appropriating an appropriate generic message from the generic message composing facility if it is determined that said generic message is available;

providing an appropriate translation of the appropriated generic message in a second language if it is determined that said generic message is available;

adding a translation of the returned message in said second language to the generic message composing facility if it is determined that said generic message is not available; and outputting the translated message to the application in said second language.

\* \* \* \* \*